United States Patent [19]

Crozat

[11] Patent Number: 4,944,159
[45] Date of Patent: Jul. 31, 1990

[54] PROCESS FOR PRODUCING COLD BY SOLID-GAS REACTION AND DEVICE PERTAINING THERETO

[75] Inventor: Georges Crozat, Perpignan, France

[73] Assignees: Faiveley Entreprises, Saint-Ouen; Societe Nationale Elf Aquitaine, Courbevoie, both of France

[21] Appl. No.: 315,683

[22] PCT Filed: May 20, 1988

[86] PCT No.: PCT/FR88/00255

§ 371 Date: Mar. 22, 1989

§ 102(e) Date: Mar. 22, 1989

[87] PCT Pub. No.: WO88/09465

PCT Pub. Date: Dec. 1, 1988

[30] Foreign Application Priority Data

May 22, 1987 [FR] France .................................. 87 07209

[51] Int. Cl.⁵ .............................................. F25B 15/00
[52] U.S. Cl. ......................................... 62/112; 62/480
[58] Field of Search ................................ 62/480, 112

[56] References Cited

U.S. PATENT DOCUMENTS

| | | |
|---|---|---|
| 1,808,056 | 6/1931 | Mitchell . |
| 1,932,492 | 10/1933 | Smith . |
| 4,165,952 | 8/1979 | Bennett ............................ 62/480 X |
| 4,319,626 | 3/1982 | Papazian et al. ........................ 165/1 |
| 4,610,148 | 9/1986 | Shelton ................................. 62/480 |
| 4,623,018 | 11/1986 | Takeshita et al. ................ 62/480 X |
| 4,637,218 | 1/1987 | Tchernev ............................ 62/480 X |
| 4,694,659 | 9/1987 | Shelton ............................... 62/480 X |
| 4,713,944 | 12/1987 | Januschkowetz ..................... 62/480 |
| 4,765,395 | 8/1988 | Paeye et al. ...................... 62/480 X |

FOREIGN PATENT DOCUMENTS

| | | |
|---|---|---|
| 0196343 | 10/1986 | European Pat. Off. . |
| 683767 | 6/1930 | France . |
| 751102 | 8/1933 | France . |
| 766022 | 6/1934 | France . |
| 2012954 | 3/1970 | France . |
| 2113344 | 6/1972 | France . |
| 2377589 | 8/1978 | France . |
| 2465970 | 3/1981 | France . |
| 2470356 | 5/1981 | France . |

Primary Examiner—Lloyd L. King
Attorney, Agent, or Firm—Young & Thompson

[57] ABSTRACT

A device for producing cold between $+10°$ C. and $-40°$ C., particularly in transport vehicles comprises at least one reactor (R), a condenser (C), a gas collector (Co) and an evaporator (E). The following simultaneous reactions are produced in the reactor (R):

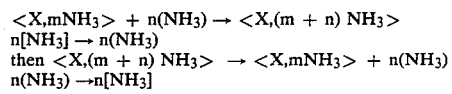

the symbols $< >$; $[\ ]$ and $(\ )$ denoting the solid, liquid and gaseous states respectively, X being chosen from $ZnCl_2$, $CuSO_4$, $CuCl$, $LiBr$, $LiCl$, $ZnSO_4$, $SrCl_2$, $MnCl_2$, $FeCl_2$, $MgCl_2$, $CaCl_2$, and $NiCl_2$, m and n being numbers such that:

| | |
|---|---|
| $m = 3, n = 1$ | if $X = ZnSO_4$ |
| $m = 4, n = 1$ | if $X = CUSO_4$ |
| $m = 0, n = 1$ | if $X = LiCl, SrCl_2$ |
| $m = 1, n = 1$ | if $X = LiCl, CaCl_2$ |
| $m = 2, n = 2$ | if $X = ZnCl_2, CuSO_4$ |
| $m = 1, n = 0.5$ | if $X = CuCl$ |
| $m = 2, n = 1$ | if $X = LiBr, ZnSO_4$ |
| $m = 2, n = 4$ | if $X = MnCl_2, FeCl_2, NiCl_2$ |
| $m = 4, n = 2$ | if $X = MgCl_2$. |

18 Claims, 9 Drawing Sheets

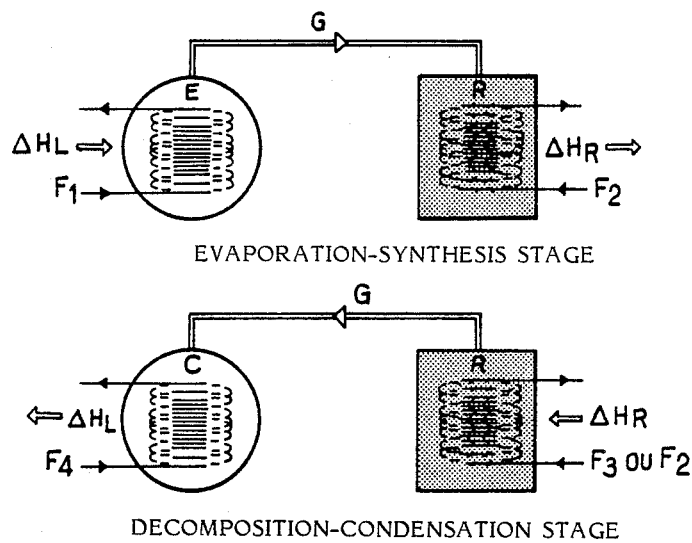
FIG_1
PRIOR ART
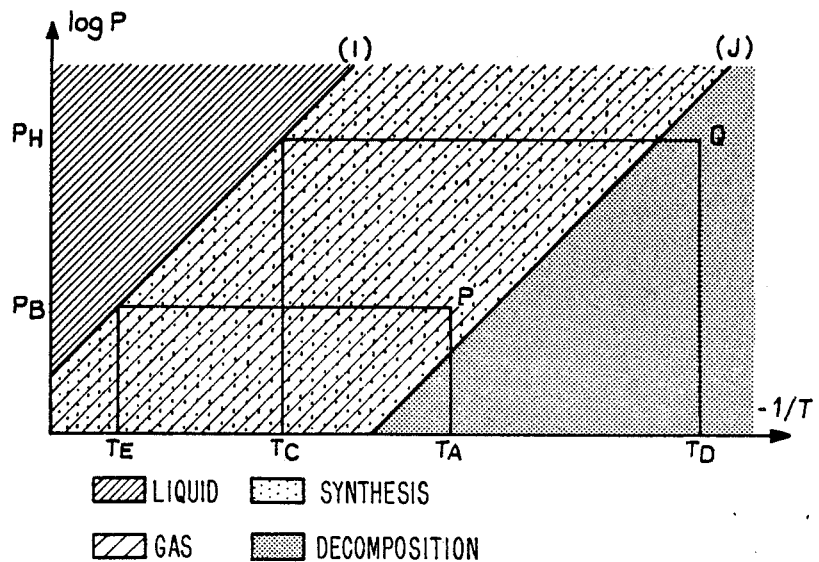
FIG_2
PRIOR ART

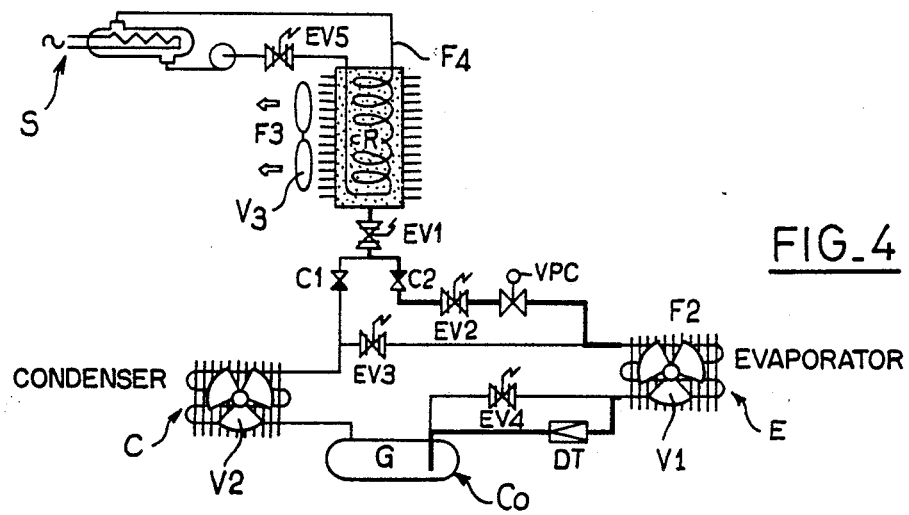
FIG_4
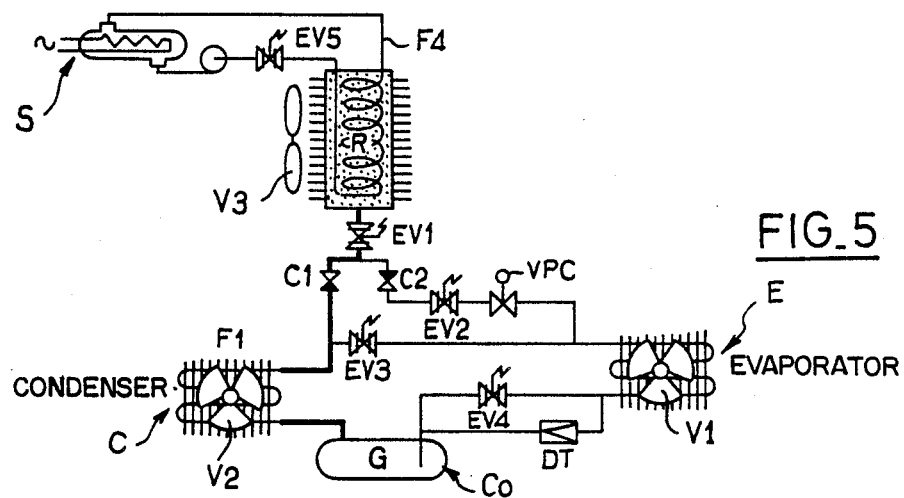
FIG_5
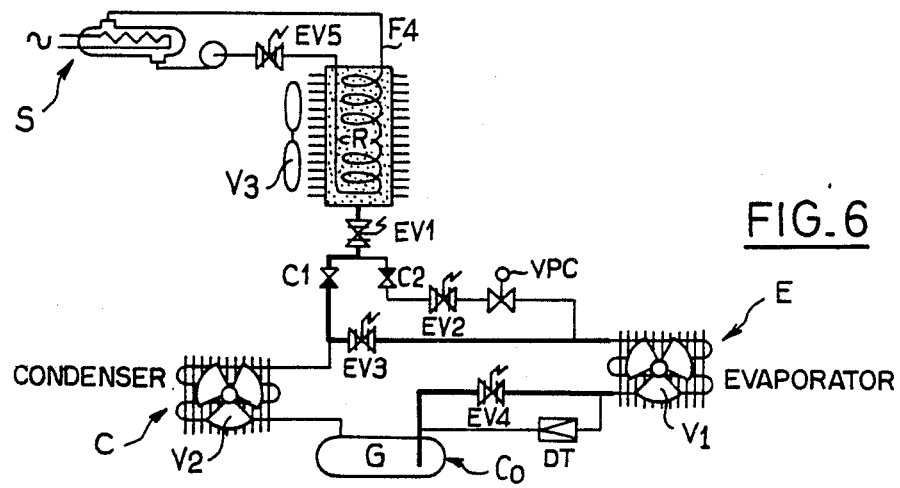
FIG_6

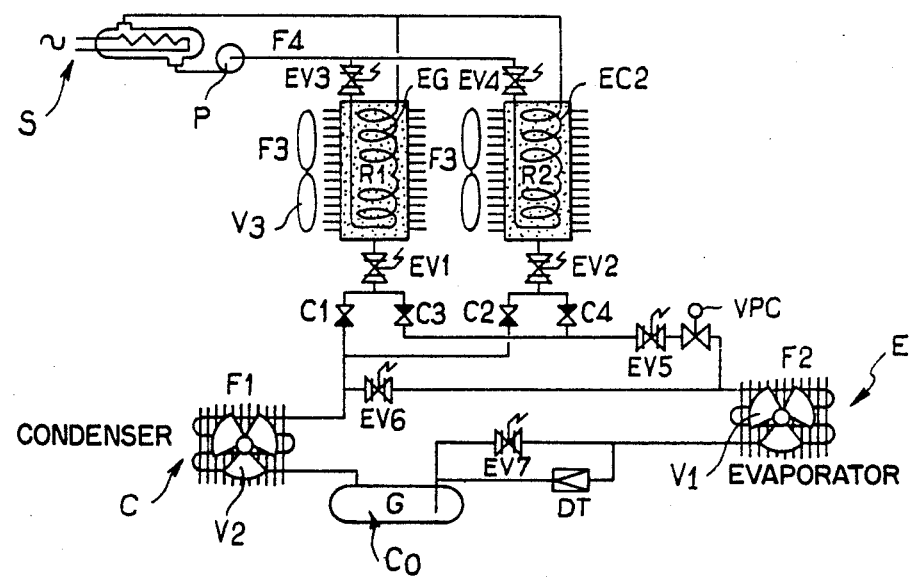
FIG_7

PROCESS FOR PRODUCING COLD BY SOLID-GAS REACTION AND DEVICE PERTAINING THERETO

The present invention relates to a process for producing cold by solid-gas reaction.

The invention also relates to the device for implementing this process.

At present, plants for producing cold make use almost exclusively of compression cycle (compressor—condenser—expansion valve—evaporator).

The advantages of these plants lie chiefly in the fact that they make use of a very well known and proven technique, and make it possible to obtain a good performance (approximately 2 in air conditioning), 1.5 at about 0° C., below 1 in the case of very low temperatures).

The disadvantages of these plants are linked with the presence of the compressor, which presents problems of maintenance and, obviously, with the need to have mechanical energy available (generally in electric form).

The absorption cycle is based on the affinity of one fluid for another. A cycle of this kind comprises an evaporator, an absorber, a separator boiler, a condenser and an expansion valve.

In the case of low temperatures, the formula which is generally adopted is the ammonia/water solution. The advantage of the absorption cycle is that it requires only heat energy (waste heat, gas, lean gas etc.) and that it does not employ essential mechanical parts.

The disadvantages of this cycle are: a relatively low performance (below 0.5–0.8) and the fact that it demands the circulation of a large quantity of solution.

Other known devices for producing cold are gas expansion (airplane air-conditioning), the Peltier effect, and solid sorption systems, which are described hereinafter.

The solid-gas systems make use of adsorption or reaction phenomena. They involve chiefly the following systems:

the zeolite water (Z water) system, limited to a temperature above 0° C., the active carbon-methanol (AC-methanol) system the hydride systems the salt/ammonia or ammonia derivative systems.

The development of the first three systems above has encountered the following difficulties:

low energy density (Z-water, AC-methanol)

rare products and the presence of hydrogen (hydrides)

system under very low pressure (Z-water)

difficulties of management in the case of divariant systems (Z-water, AC methanol).

The development of salt/ammonia or derivative systems has long been held back by the low powers obtained. Studies carried out on transfers (of mass and of heat) and on kinetics-transfers couplings, have led to the investigation of a binder permitting these transfers to be improved.

The research carried out has made it possible to produce reaction mixtures which under certain conditions produce powers of several kW/kg of salt. This power level makes it possible to design systems whose performance is comparable to the conventional compression systems employed at present.

The basis of the system for producing cold by solid-gas reaction will be recalled below. Under given temperature and pressure conditions, certain solids can react with certain gases: this reaction results in the formation of a defined, generally solid, chemical compound and is accompanied by a heat release. When, under other temperature and pressure conditions, heat is introduced into the compound thus formed, a gas release and the formation of the initial solid product are observed.

The operation of the system takes place, therefore, in two stages which are offset in time, illustrated by FIG. 1, and explained below:

In the first stage, known as an "evaporation-synthesis stage", evaporation of a refrigerant fluid and reaction of the gas thus formed with the solid take place simultaneously:

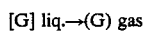

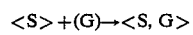
(I)

The fluid F1 supplies the heat ΔHL to the evaporator E. The liquid [G] evaporates and the gas formed is fixed in the reactor R on the solid <S> to give the compound <S,G>. In the reactor R, the reaction is accompanied by a release of heat ΔHR, the latter being removed by the fluid F2. The cold source is therefore the evaporator E, the cold being used directly or indirectly starting with the fluid F1.

In the second stage, called a "decomposition - condensation stage", decomposition of the solid <S,G> takes place simultaneously with release of the gas (G), in the reactor R, and with condensation of (G) in the condenser C:

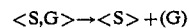

The heat ΔHR is contributed to the solid <S,G> contained in the reactor R by the fluid F3 (or the fluid F2 employed previously). Under the effect of the heat, the gas (G) is released and condenses in C, the condensation being accompanied by the release of heat ΔHL, the latter being removed by the fluid F4.

The thermodynamic characteristics of the system employed are as follows:

Since a true chemical reaction between a solid and a gas is present, a monovariant system at equilibrium is involved, that is to say that there exists an unambiguous relationship between the temperature and pressure, of the form:

Log P = A − B/T in which expression P is the pressure, T the temperature (expressed in degrees K), A and B being constants characteristic of the solid/gas pair employed.

The two stages of operation may be represented on a pressure/temperature diagram, as shown in FIG. 2.

In this FIG. 2, (I) is the equilibrium (G)→>[G] and (J) is the equilibrium

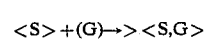

The equilibrium straight line (I) determines two regions in which either condensation or evaporation of the compound (G) takes place. The equilibrium straight line (J) determines two regions in which there is either synthesis of the compound <S,G> from <S> and from <G>, or decomposition of the solid <S,G> with release of (G).

During the evaporation-synthesis stage, [G] evaporates at the temperature TE and will react with the solid <S> which is at temperature TA. This temperature TA is such that the operating point of the solid (point P) is in a synthesis region. This stage takes place at the pressure PB.

During the decomposition-condensation stage, the compound <S,G> is at a temperature TD such that the operating point of the solid (point Q) is in a decomposition region. The compound (G) which is released will condense at the temperature TC. This stage takes place at the pressure PH such that PH is higher than PB.

None of the solid-gas reactions known at present makes it possible to produce cold down to −40° C., the maximum temperature outside the enclosure being +30° C., and at the same time to produce cold down to +10° C., the maximum temperature outside the enclosure being +80° C.

A reaction which would make it possible to obtain these temperatures would be particularly well adapted to the production of an industrial device for producing cold in vehicles for transporting products such as foodstuffs which are deep-frozen or kept at low temperature.

The purpose of the present invention is precisely to achieve this objective.

The process to which the invention relates makes it possible to produce cold by means of a device comprising a reactor which contains a solid compound capable of reacting with a gas according to an exothermic reaction, this reactor being connected to a condenser, a gas collector and an evaporator which is in a heat exchange relationship with an enclosure to be cooled, the interior of the reactor being in a heat exchange relationship with an external heat source.

According to the invention, a feature of this process is that the following simultaneous reactions are produced in the reactor:

<X,mNH₃> + n(NH₃) → <X,(m + n) NH₃>
n[NH₃] → n(NH₃)
then <X,(m + n) NH₃> → <X,mNH₃> + n(NH₃)
n(NH₃) → n[NH₃]

X being chosen from $ZnCl_2$, $CuSO_4$, CuCl, LiBr, LiCl, $ZnSO_4$, $SrCl_2$, $MnCl_2$, $FeCl_2$, $MgCl_2$, $CaC_2$ and $NiC_2$, m and n being numbers such that:

| | |
|---|---|
| m = 3, n = 1 | if X = $ZnSO_4$ |
| m = 4, n = 1 | if X = $CUSO_4$ |
| m = 0, n = 1 | if X = LiCl, $SrCl_2$ |
| m = 1, n = 1 | if X = LiCl, $CaCl_2$ |
| m = 2, n = 2 | if X = $ZnCl_2$, $CuSO_4$ |
| m = 1, n = 0.5 | if X = CuCl |
| m = 2, n = 1 | if X =. LiBr, $ZnSO_4$ |
| m = 2, n = 4 | if X = $MnCl_2$, $FeCl_2$, $NiCl_2$ |
| m = 4, n = 2 | if X = $MgCl_2$ |

The symbols <>, [], ( ) above refer to a compound in the solid state, in the liquid state and in the gaseous state, respectively.

Thus, if the intention is to produce cold down to −40° C. in the enclosure to be refrigerated, the maximum temperature outside the latter being not more than 30+ C., the distance of the point Q (FIG. 2) relative to the equilibrium straight line J being 20° C. and the condensation temperature being 35° C., an external heat source is employed, whose temperature is higher than a value $T_h$ such that:

| | | |
|---|---|---|
| if X = $ZnCl_2$ | (m = 2, n = 2) | $T_h$ = 139° C. |
| if X = $CuSO_4$ | (m = 4, n = 1) | $T_h$ = 145° C. |
| if X = CuCl | (m = 1, n = 0.5) | $T_h$ = 151° C. |
| if X = LiBr | (m = 2, n = 1) | $T_h$ = 155° C. |
| if X = LiCl | (m = 1, n = 1) | $T_h$ = 167° C. |
| if X = $ZnSO_4$ | (m = 3, n = 1) | $T_h$ = 173° C. |
| if X = $SrCl_2$ | (m = 0, n = 1) | $T_h$ = 173° C. |
| If X = $MnCl_2$ | (m = 2, n = 4) | $T_h$ = 174° C. |
| if X = LiCl | (m = 0, n = 1) | $T_h$ = 203° C. |
| if X = $FeCl_2$ | (m = 2, n = 4) | $T_h$ = 208° C. |
| if X = $MgCl_2$ | (m = 4, n = 2) | $T_h$ = 217° C. |
| if X = $CuSO_4$ | (m = 2, n = 2) | $T_h$ = 230° C. |
| if X = $ZnSO_4$ | (m = 2, n = 1) | $T_h$ = 247° C. |
| if X = $CaCl_2$ | (m = 1, n = 1) | $T_h$ = 265° C. |
| if X = $NiCl_2$ | (m = 2, n = 4) | $T_h$ = 282° C. |

Furthermore, if the intention is to produce cold down to +10° C. in the enclosure to be refrigerated, the maximum temperature outside the latter being not more than +80° C., the distance of the point Q (FIG. 2) relative to the equilibrium straight line J being 20° C. and the condensation temperature being 85° C., an external heat source is employed, whose temperature is higher than a value $T_h$ such that:

| | | |
|---|---|---|
| if X = $ZnCl_2$ | (m = 2, n = 2) | $T_h$ = 162° C. |
| if X = $CuSO_4$ | (m = 4, n = 1) | $T_h$ = 170° C. |
| if X = CuCl | (m = 1, n = 0.5) | $T_h$ = 180° C. |
| if X = LiBr | (m = 2, n = 1) | $T_h$ = 196° C. |
| if X = $ZnSO_4$ | (m = 3, n = 1) | $T_h$ = 200° C. |
| if X = LiCl | (m = 1, n = 1) | $T_h$ = 208° C. |
| If X = $MnCl_2$ | (m = 2, n = 4) | $T_h$ = 212° C. |
| if X = $SrCl_2$ | (m = 0, n = 1) | $T_h$ = 217° C. |
| if X = LiCl | (m = 0, n = 1) | $T_h$ = 249° C. |
| if X = $FeCl_2$ | (m = 2, n = 4) | $T_h$ = 256° C. |
| if X = $MgCl_2$ | (m = 4, n = 2) | $T_h$ = 256° C. |
| if X = $CuSO_4$ | (m = 2, n = 2) | $T_h$ = 265° C. |
| if X = $ZnSO_4$ | (m = 2, n = 1) | $T_h$ = 282° C. |
| if X = $CaCl_2$ | (m = 1, n = 1) | $T_h$ = 311° C. |
| if X = $NiCl_2$ | (m = 2, n = 4) | $T_h$ = 338° C. |

The invention also relates to a device for producing cold at a temperature of between −40° C. and +10° C., in which the process in accordance with the invention is implemented.

Another aim of the invention is to create a device permitting cold to be produced continuously.

According to the invention, this device comprises two reactors containing the same solid compound, communication circuits between these reactors, the evaporator, the condenser and the gas collector, and means are provided for successively triggering the solid-gas reactions in the two reactors and for producing the opening and closing of the various communication circuits in a predetermined order, to obtain a continuous production of cold.

According to a preferred version of the invention, the abovementioned means are adapted to permit the following succesive steps of operation:
 (A) opening of :ne circuit between one of the reactors and the evaporator and between the latter and the gas collector,
 (B) opening of the circuit between the evaporator and the first reactor as soon as the gas pressure in the evaporator is higher than that in the first reactor, (C) opening of the circuit between the other reactor and the evaporator and between the latter and the gas collector, (D) opening of the circuit between the evaporator and the second reactor as soon as the gas pressure in the evaporator is higher than that in the second reactor, (E) opening of the circuit between the first reactor and the external heat source to heat the solid contained in this reactor, (F) opening of the circuit between the first reactor and the condenser as soon as the pressure in the reactor is higher than that in the condenser, (G) closing of the circuit between the first reactor and the heat source and opening of the circuit between the second reactor and the heat source, (H) closing, under the effect of the pressure prevailing in the second reactor, of the circuit included between the latter and the evaporator and opening of the circuit between the second reactor and the condenser, (I) closing, after a pressure drop in the first reactor, of the circuit between the latter and the condenser and opening of the circuit between this reactor and the evaporator.

According to an advantageous version of the invention, the device comprises a third reactor containing the said solid compound capable of reacting with the gas and connected to the external heat source, the condenser, the collector and the evaporator, means being provided for successively starting the solid-gas reactions in the three reactors in such a way that the third reactor can store energy without any energy input other than that needed for the circulation of the heat transfer fluid.

Other special features and advantages of the invention will become apparent again in the description below.

In the attached drawings, given by way of examples, without any limitation being implied:

FIG. 1 is a schematic view illustrating the two successive stages of the prior art process for producing cold from a solid-gas system using reaction phenomena;

FIG. 2 is a pressure versus temperature diagram illustrating the operation of the prior art system of FIG. 1;

Figure 3:
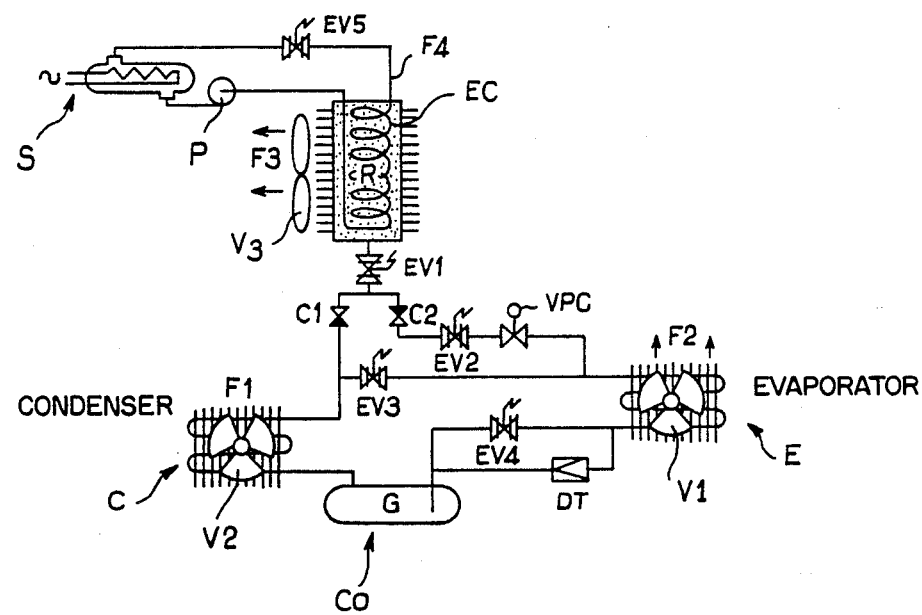
FIG. 3 is the diagram of a device for producing cold, with a single reactor.
Figure 8:
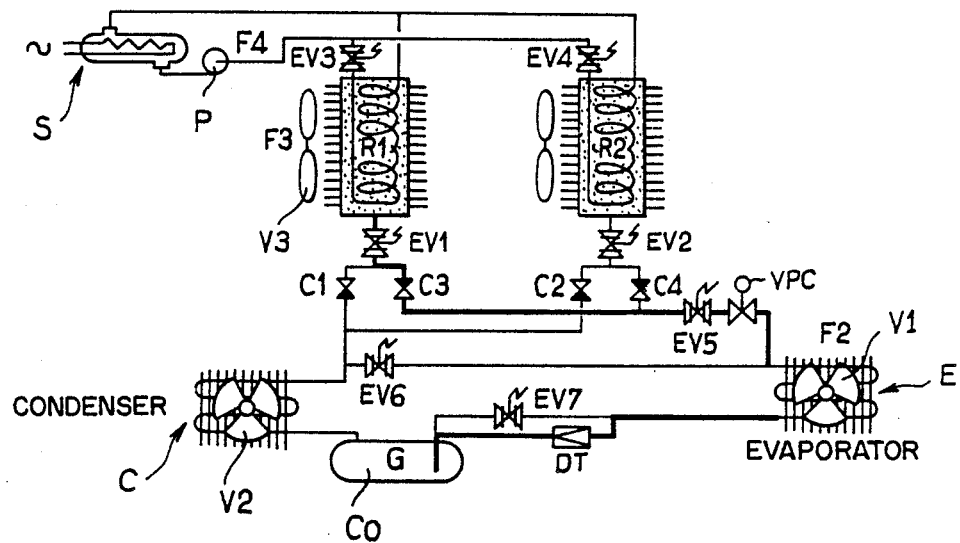
Figure 9:
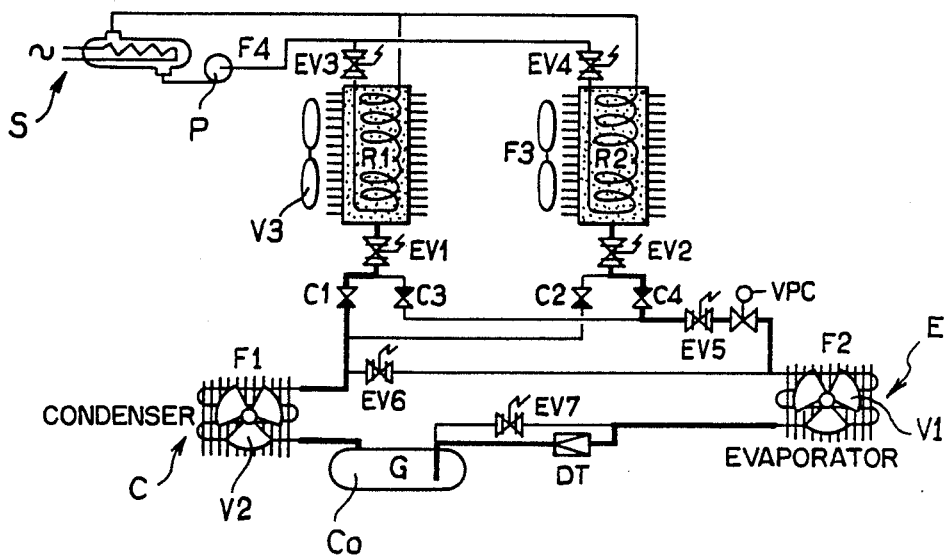
Figure 10:
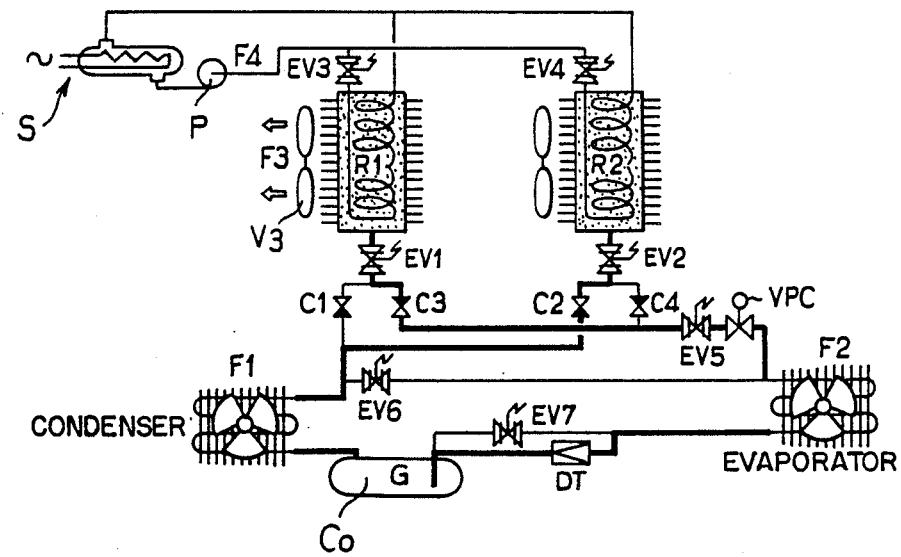
Figure 11:
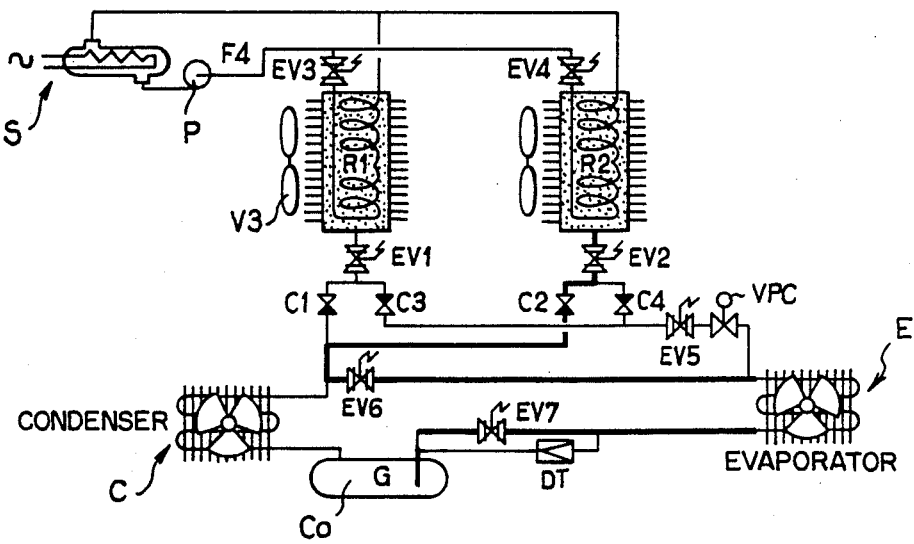
Figure 12:
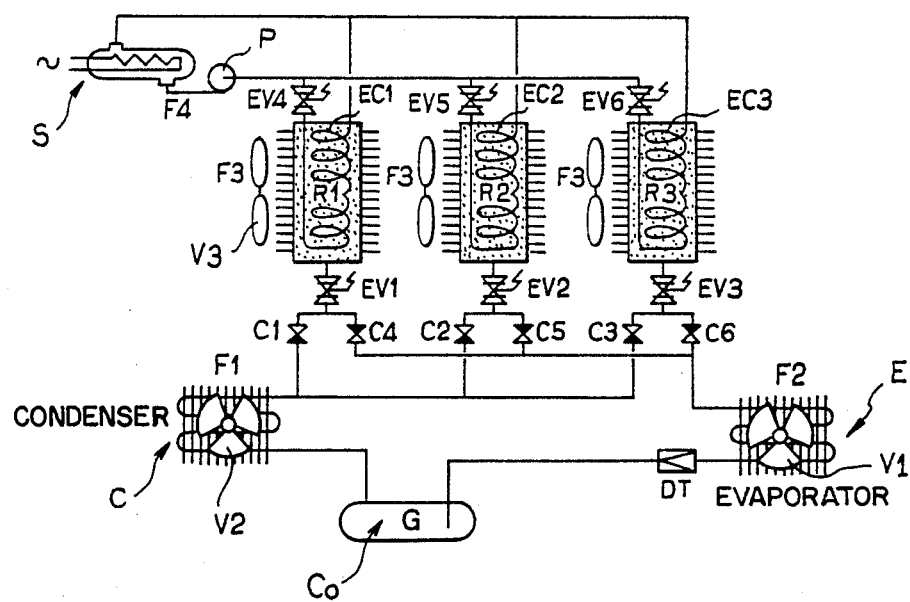
Figure 13:
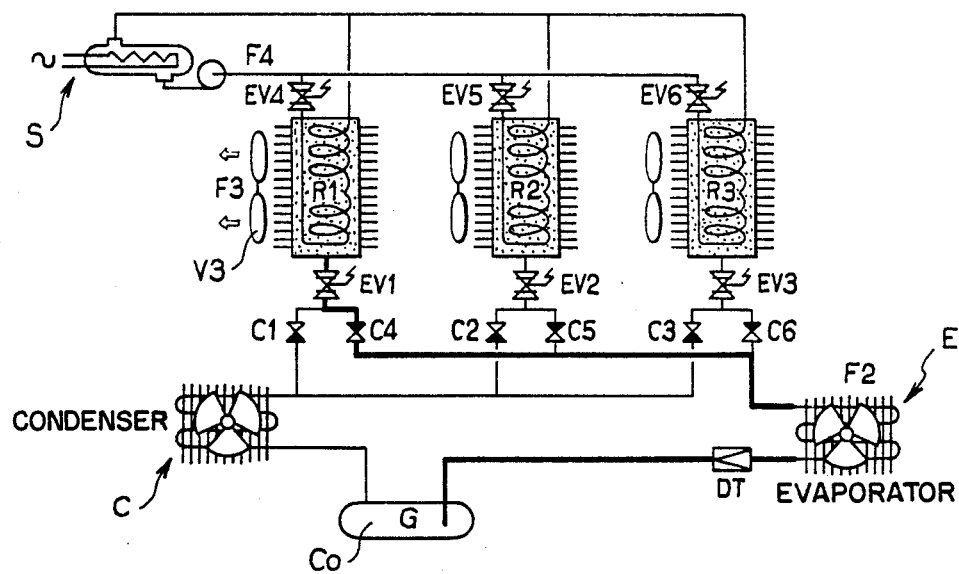
Figure 14:
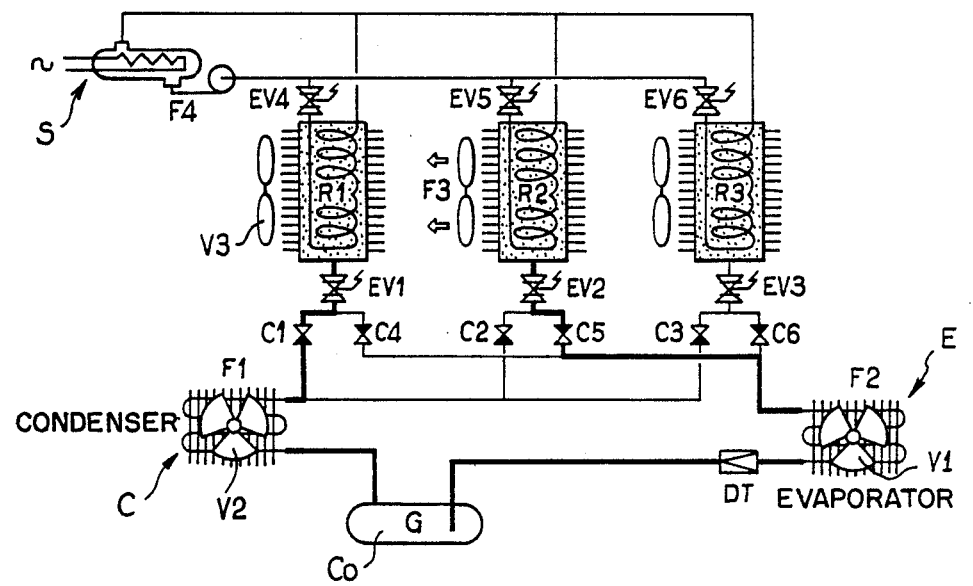
Figure 15:
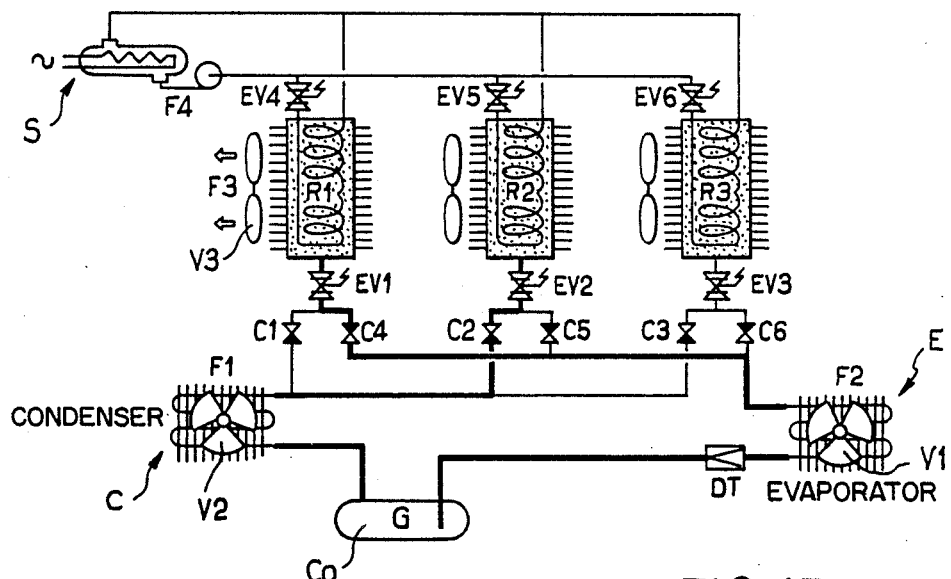
Figure 16:
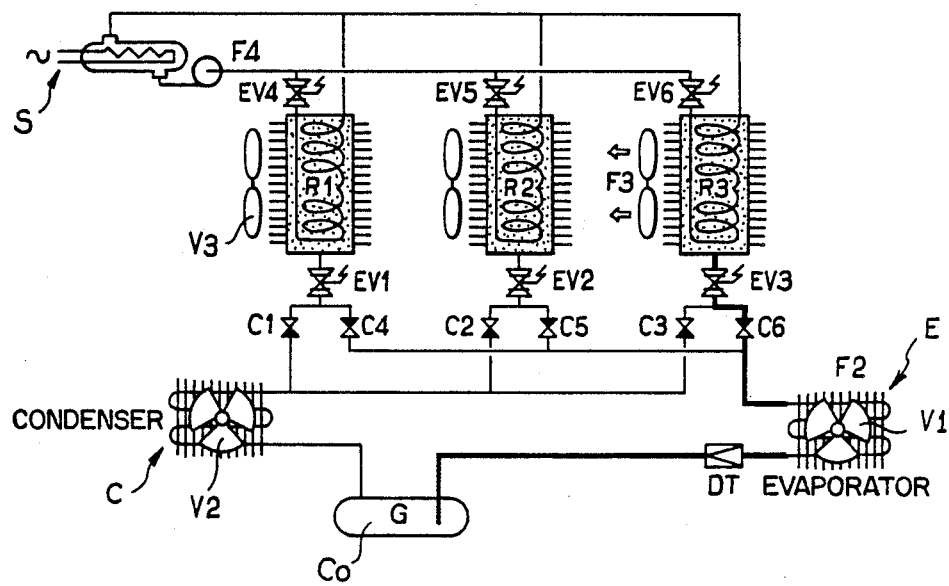

FIG. 4 is a diagram similar to FIG. 3, showing the first step of the operation of the device according to FIG. 3, FIG. 5 shows the second step of the operation of the device according to FIG. 3, FIG. 6 shows the third step of the operation of the device according to FIG. 3, FIG. 7 is the diagram of a device for producing cold, with two reactors, FIG. 8 shows the first step of the operation of the device according to FIG. 7, FIG. 9 shows the second step of the operation of the device according to FIG. 7, FIG. 10 shows the third step of the operation of the device according to FIG. 7, FIG. 11 shows the fourth step of the device according to FIG. 7, FIG. 12 is the diagram of a device for producing cold, with three reactors, FIG. 13 shows the first step of the operation of the device according to FIG. 12, FIG. 14 shows the second step of the operation of the device according to FIG. 12, FIG. 15 shows the third step of the operation of the device according to FIG. 12, FIG. 16 shows the fourth step of the operation of the device according to FIG. 12.

Shown in the embodiment of FIG. 3 is a device for producing cold noncontinuously from a physicochemical phenomenon by reacting manganese chloride with ammonia, as indicated below:

$$<MnCl_2, 2NH_3> + 4(NH_3) \rightarrow <MnCl_2, 6NH_3>$$

This device comprises:

a reactor R containing the solid reaction medium $<MnCl_2, 2NH_3>$ which is connected to a condenser C, a collector Co for liquefied gas G comprised between the latter and an evaporator E.

This device furthermore comprises a nonreturn valve C1 in the circuit connecting the reactor R to the condenser C, a nonreturn valve C2 in the circuit connecting the evaporator E to the reactor E, a thermostatic expansion valve DT in the circuit connecting the reactor R to the evaporator E, a controlled pressure valve VPC, a solenoid valve EV1 isolating the reactor R from the remainder of the circuit, a solenoid valve EV2 isolating the evaporator E from the reactor R, two solenoid valves EV3 and EV4 for defrosting and a solenoid valve EV5 permitting a heat transfer fluid F4 to be distributed into the exchanger EC contained in the reactor E and connected to an external heat source S by means of a pump P.

The various steps of operation of the device are illustrated by FIGS. 4 to 6 and by the table below:

TABLE 1

| Stages | Stop | Start-ups | Cycle | | Defrosting |
|---|---|---|---|---|---|
|  | 0 | 0 | 1 | 2 | 3 |
| EV1 | C | 0 | 0 | 0 | 0 |
| EV2 | C | 0 | 0 | 0 | C |
| EV3 | C | C | C | C | 0 |
| EV4 | C | C | C | C | 0 |
| EV5 | C | C | C | 0 | 0 |
| C1 | C | C | C | 0 | 0 |
| C2 | C | C | 0 | C | C |

*0 = open; C = closed

Initial state: step 0

The reactor R has a maximum cold potential, that is to say that the solid within consist of salt <S> capable of reacting with the gas (G).

All the solenoid valves are closed and the collector Co is filled with refrigerant fluid [G]. To start up, the solenoid valve EV1 is opened.

Step 1 (FIG. 4)

The solenoid valve EV2 opens, the fluid G travels from the condenser C towards the evaporator E. In the latter it vaporizes, the heat being given up by the fluid F2, for example air, which is employed for conveying the cold produced. The fluid F2 carries the negative calories throughout the enclosure to be cooled. In the example shown, air is blown into this enclosure by means of a fan V1.

The thermostatic expansion valve (VPC) controls the pressure in the evaporator E and consequently the temperature of the liquid G boiling in the evaporator E. When the pressure in the evaporator E is higher than the pressure in the reactor R, the valve C2 opens and the gas (G) reacts with the solid <S> in the reactor R, the heat of reaction being removed by means of an exchanger where F3 circulates. The fluid F3 is air propelled by a motor-driven fan V3 which removes the heat of exothermic reaction to the outside.

Step 2 (FIG. 5)

When the synthesis reaction has ended in the reactor R, the valve EV5 opens, the solid <S,G> present in the reactor R is heated by the fluid F4 which is, for example, a thermal oil. When the pressure in the reactor R is higher than that prevailing in the condenser C, or in the collector Co, the valve C1 opens, the valve C2 having closed as soon as the pressure in the reactor R was higher than that prevailing in the evaporator E.

The gas originating from the reactor R condenses in the condenser C and then flows into the collector Co, the heat of condensation being removed by the fluid F1, the fluid F1 being air, as in a traditional compression plant, blown in by means of a fan V2.

During this step 2 no cold production takes place, since the fluid [G] cannot circulate in the evaporator. The production of cold is therefore noncontinuous.

Step 3 (FIG. 6)

This step, when forming part of the cycle, corresponds to defrosting. The latter takes place within the evaporator E itself, employing it as a condenser.

The initiation of the defrosting operation must take place during step 2, that is to say during the operation of the composition of the solid in the reactor R.

For this operation, the valve EV2 closes and the valve EV3 opens, simultaneously.

The gas (G) originating from the decomposition reaction in the reactor R condenses preferentially in the evaporator E and thus produces the defrosting. Since the valve EV4 is open, the condensed fluid [G] flows into the collector Co.

Step 4

In this step, step 1, that is to say the production of cold by the evaporator E, recommences.

The device just described, although producing cold noncontinuously, makes it possible to produce cold down to $-40°$ C. in the enclosure to be refrigerated, on condition that the maximum temperature outside the latter does not exceed 30° C.

To this end, it is necessary:

(1) to produce the following simultaneous reactions inside the reactor R:

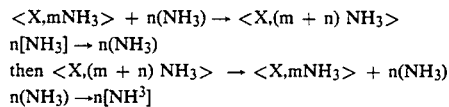

$$<X, mNH_3> + n(NH_3) \rightarrow <X,(m + n) NH_3>$$
$$n[NH_3] \rightarrow n(NH_3)$$
then $<X,(m + n) NH_3> \rightarrow <X, mNH_3> + n(NH_3)$
$$n(NH_3) \rightarrow n[NH^3]$$

X being chosen from $ZnCl_2$, $CuSO_4$, $CuCl$, $LiBr$, $LiCl$, $ZnSO_4$, $SrCl_2$ $MnCl_2$, $FeCl_2$, $MgCl_2$, $CaCl_2$ and $NiCl_2$, m and n being numbers such that:

| | |
|---|---|
| m = 3, n = 1 | if X = $ZnSO_4$ |
| m = 4, n = 1 | if X = $CUSO_4$ |
| m = 0, n = 1 | if X = $LiCl$, $SrCl_2$ |
| m = 1, n = 1 | if X = $LiCl$, $CaCl_2$ |
| m = 2, n = 2 | if X = $ZnCl_2$, $CuSO_4$ |
| m = 1, n = 0.5 | if X = $CuCl$ |
| m = 2, n = 1 | if X = $LiBr$, $ZnSO_4$ |
| m = 2, n = 4 | if X = $MnCl_2$, $FeCl_2$, $NiCl_2$ |
| m = 4, n = 2 | if X = $MgCl_2$ |

(2) that the external heat source S is at a temperature $T_h$ higher than a value such that:

| | | |
|---|---|---|
| if X = $ZnCl_2$ | (m = 2, n = 2) | $T_h$ = 139° C. |
| if X = $CuSO_4$ | (m = 4, n = 1) | $T_h$ = 145° C. |
| if X = $CuCl$ | (m = 1, n = 0.5) | $T_h$ = 151° C. |
| if X = $LiBr$ | (m = 2, n = 1) | $T_h$ = 155° C. |
| if X = $LiCl$ | (m = 1, n = 1) | $T_h$ = 167° C. |
| if X = $ZnSO_4$ | (m = 3, n = 1) | $T_h$ = 173° C. |
| if X = $SrCl_2$ | (m = 0, n = 1) | $T_h$ = 173° C. |
| If X = $MnCl_2$ | (m = 2, n = 4) | $T_h$ = 174° C. |
| if X = $LiCl$ | (m = 0, n = 1) | $T_h$ = 203° C. |
| if X = $FeCl_2$ | (m = 2, n = 4) | $T_h$ = 208° C. |
| if X = $MgCl_2$ | (m = 4, n = 2) | $T_h$ = 217° C. |
| if X = $CuSO_4$ | (m = 2, n = 2) | $T_h$ = 230° C. |
| if X = $ZnSO_4$ | (m = 2, n = 1) | $T_h$ = 247° C. |
| if X = $CaCl_2$ | (m = 1, n = 1) | $T_h$ = 265° C. |
| if X = $NiCl_2$ | (m = 2, n = 4) | $T_h$ = 282° C. |

If the intention is to produce cold down to $+10°$ C. in the enclosure to be refrigerated, the maximum temperature outside the latter being not more than $+80°$ C., with the aid of the same solid-gas reactions, the temperature $T_h$ of the source S will need to be higher than a value such that:

| | | |
|---|---|---|
| if X = $ZnCl_2$ | (m = 2, n = 2) | $T_h$ = 162° C. |
| if X = $CuSO_4$ | (m = 4, n = 1) | $T_h$ = 170° C. |
| if X = $CuCl$ | (m = 1, n = 0.5) | $T_h$ = 180° C. |
| if X = $LiBr$ | (m = 2, n = 1) | $T_h$ = 196° C. |
| if X = $ZnSO_4$ | (m = 3, n = 1) | $T_h$ = 200° C. |
| if X = $LiCl$ | (m = 1, n = 1) | $T_h$ = 208° C. |
| If X = $MnCl_2$ | (m = 2, n = 4) | $T_h$ = 212° C. |
| if X = $SrCl_2$ | (m = 0, n = 1) | $T_h$ = 217° C. |
| if X = $LiCl$ | (m = 0, n = 1) | $T_h$ = 249° C. |
| if X = $FeCl_2$ | (m = 2, n = 4) | $T_h$ = 256° C. |
| if X = $MgCl_2$ | (m = 4, n = 2) | $T_h$ = 256° C. |
| if X = $CuSO_4$ | (m = 2, n = 2) | $T_h$ = 265° C. |
| if X = $ZnSO_4$ | (m = 2, n = 1) | $T_h$ = 282° C. |
| if X = $CaCl_2$ | (m = 1, n = 1) | $T_h$ = 311° C. |
| if X = $NiCl_2$ | (m = 2, n = 4) | $T_h$ = 338° C. |

It is possible, therefore, with the aid of the same single reaction chosen from the reactions above and using a heat source S whose temperature is at the appropriate value, to provide cold at a temperature of between $+10°$ C. and $-40°$ C.

The devices for producing cold which will now be described make it possible, furthermore, to produce cold continuously, which makes them particularly suited to industrial needs, especially in transport vehicles.

The device shown in FIG. 7 comprises chiefly:

two identical reactors (R1 and R2) containing the solid reaction medium,
a condenser C,
a collector Co for liquefied gas G,
an evaporator E, two nonreturn valves (C1 and C2) in the circuits connecting the reactors R1 and R2 to the condenser C, two nonreturn valves (C3 and C4) in the circuits connecting the evaporator E to the reactors R1 and R2, a thermostatic expansion valve (DT) between the evaporator E and the collector Co, a controlled pressure valve (VPC) between the reactors R1, R2 and the evaporator E, two solenoid valves (EV1 and EV2) isolating the reactors R1 and R2 from the remainder of the circuit, a solenoid valve (EV5) isolating the evaporator E from the reactors R1 and R2, two solenoid valves (EV6 and EV7) for defrosting, two solenoid valves (EV3 and EV4) permitting a fluid F4 to be distributed into the exchangers EC1 and EC2 contained in the reactors R1 and R2.

The various steps of operation of this device are illustrated by FIGS. 8 to 11 and by the table 2 below.

TABLE 2

|  | Start up | Cycle | | Defrosting* | | Recharge |
| --- | --- | --- | --- | --- | --- | --- |
| Stages | 0 | 1 | 2 | 3 | 4 | 5 | 6 |
| EV1 | C | O | O | O | O | O | O |
| EV2 | C | C | O | O | O | O | O |
| EV3 | C | C | O | C | C | C | O |
| EV4 | C | C | C | O | O | O | O |
| EV5 | C | O | O | O | C | O | O |
| EV6 | C | C | C | C | O | C | C |
| EV7 | C | C | C | C | O | C | C |
| F3 to | — | R1 | R2 | R1 | R1 | R1 | |
| C1 | C | C | O | C | C | C | O |
| C2 | C | C | C | O | O | O | O |
| C3 | C | O | C | O | C | O | C |
| C4 | C | C | O | C | C | C | C |

*case where the defrosting takes place during step 3

Initial state: Step 0

The reactors R1 and R2 have a maximum cold potential, that is to say that the solid within consist of salt <S> capable of reacting with the gas (G). All the solenoid valves are closed and the collector Co is filled with refrigerant fluid.

Step 1: (FIG. 8)

The solenoid valves EV1 and EV5 open. The fluid G travels from the collector Co towards the evaporator E. It vaporizes in the latter, the heat being given up by the fluid F2 which is therefore employed for producing cold.

Since fluid F2 is air, it carries the negative calories into the enclosure to be cooled.

The thermostatic expansion valve (DT) prevents the fluid F from travelling in the liquid state beyond the evaporator E. The valve VPC controls the evaporation pressure level and hence the evaporation temperature. When the pressure in the evaporator E is higher than the pressure in the reactor R1, the valve C3 opens and the gas (G) reacts with the solid <S> in R1, the heat of reaction being removed by means of an exchanger where F3 circulates. The fluid F3 is air propelled by a motor-driven fan V3 which removes the heat of exothermic reaction to the outside.

Step 2: (FIG. 9)

When the synthesis reaction has ended in the reactor R1, the valve EV2 opens. When the pressure in the evaporator E is higher than the pressure prevailing in the reactor R2, the valve C4 opens and the fluid G evaporates in the evaporator E and will react with the solid <S> present in the reactor R2.

The heat of evaporation is introduced into the evaporator E by the fluid F2 and the heat of reaction released in R2 is removed by the fluid F3.

Simultaneously with the opening of the valve EV2, opening of the valve EV3 takes place. The solid <S,G> present in the reactor R1 is heated by the fluid F4. When the pressure in the reactor R1 is higher than that prevailing in the condenser C (or in the collector Co), the valve C1 opens, the valve C3 having closed as soon as the pressure in R1 was higher than that prevailing in the evaporator E.

The gas (G) originating from the reactors R1 condenses in the condenser Co, the heat of condensation being removed by the fluid F1, and flows into the collector Co.

Step 3: (FIG. 10)

When the reactions in the reactors R1 and R2 have ended, the valve EV3 closes and the valve EV4 opens. The solid <S,G> present in R2 is heated by the fluid F4. The pressure in R2 rises and, successively, the valve C4 closes and the valve C2 opens. The gas (G) originating from R2 condenses in E, the heat of condensation being removed by the fluid F1, and flows into the collector Co.

The fluid F3 circulates in the exchanger E of the reactor R1. As the latter cools, the pressure drops and, successively, the valve C1 closes and the valve C3 opens. The fluid (G) evaporates in E and reacts in the reactor R1 with the solid <S>. The heat of evaporation is, as before, provided by the fluid F2 (air) which cools and which is therefore employed for distributing cold in the enclosure to be cooled.

Step 4: (FIG. 11)

This step, which can intervene during step 2 or 3, refers to the defrosting operation. The latter takes place within the evaporator E itself, employing it as a condenser.

When the defrosting is started, the valve EV5 closes and the valve EV6 opens.

The gas (G) originating from the decomposition reaction condenses preferentially in the evaporator E.

The heat of condensation which is released provides the defrosting. Since the valve EV7 is open, the condensed fluid G flows into the collector Co.

Step 5:

This step corresponds to the return to the normal cycle after the defrosting operation. The valves EV6 and EV7 close and EV5 opens.

The gas (G) travels from the reactor R1, heated by the fluid F4, towards the condenser C and the collector Co.

The gas (G) evaporates in E and reacts with the solid <S> in the reactor cooled by the fluid F3. As described in step 2 or 3, the cycle normally recommences by alternating steps 2 or 3.

Step 6:

This step does not correspond to the normal operating cycle, but it makes it possible to restore to the machine its whole refrigerating potential (step 0).

During this step no production of cold takes place and the two reactors R1 and R2 are restored to their maximum cold potential.

The valves EV3 and EV4 are open.

The solid (S,G> present in the reactors R1 and R2 is heated by the fluid F4.

The gas (G) produced during the decomposition of <S,G> condenses in C and flows into the collector Co. The operation ends when only solid <S> is left in each of the reactors R1 and R2. The valves EV1 to EV5 are then closed, the valves C1 and C2 closing as a result of the pressure drop in R1 and R2, the latter being a consequence of the heating of the reactors being stopped.

When employing the solid-gas reactions described previously, the above device makes it possible not only to produce cold continuously, but also to obtain temperatures between −40° C. and +10° C., which are an optimum for the low-temperature transport of foodstuffs or other products.

FIG. 12 shows a device for producing cold, permitting, by starting with a noncontinuous physicochemical phenomenon, to ensure a continuous production of cold and a storage of refrigeration energy.

This device comprises mainly:
three identical reactors (R1, R2, R3) containing the solid reaction medium,
a condenser C,
a collector Co for liquefied gas G,
an evaporator E,
three nonreturn valves (C1, C2, C3) in the circuit connecting the reactors R1, R2, R3 to the condenser C,
three nonreturn valves (C4, C5, C6) connecting the evaporator E to the reactors R1, R2, R3,
a thermostatic expansion valve (DT) between the evaporator E and the collector Co,
three solenoid valves (EV1, EV2, EV3) isolating the reactors R1, R2 and R3 from the remainder of the circuit,
three solenoid valves (EV4, EV5, EV6) permitting a fluid F4 to be distributed into the exchangers (EC1, EC2, EC3) contained in the reactors R1, R2, R3.

The various steps of operation of this device are shown in FIGS. 13 to 16 and in the table 3 below.

TABLE 3

| Steps | 0 | Cycle 1 | 2 | 3 | 4 | 5 | 6 |
|---|---|---|---|---|---|---|---|
| EV1 | C | 0 | 0 | 0 | C | 0 | 0 |
| EV2 | C | C | 0 | 0 | C | 0 | 0 |
| EV3 | C | C | C | C | 0 | C | 0 |
| EV4 | C | C | 0 | C | C | C | 0 |
| EV5 | C | C | C | 0 | C | 0 | 0 |
| EV6 | C | C | C | C | C | C | 0 |
| F3 to | — | R1 | R2 | R1 | R3 | R1 | |
| C1 | C | C | 0 | C | C | C | 0 |
| C2 | C | C | C | 0 | C | 0 | 0 |
| C3 | C | C | C | C | C | C | 0 |
| C4 | C | 0 | C | 0 | C | 0 | C |
| C5 | C | C | 0 | C | C | C | C |
| C6 | C | C | C | C | 0 | C | C |

Step 0: initial state

The reactors R1, R2 and R3 have maximum cold potential, that is to say that the solids within consist of the salt <S> capable of reacting with the gas (G). All the solenoid valves are closed and the collector Co is filled with refrigerant fluid [G].

Step 1: start-up (FIG. 13)

The solenoid valve EV1 opens. The fluid G travels from the collector Co towards the evaporator E. In the latter it evaporates, the heat being given up by the fluid F2 which is employed for distributing the cold. The thermostatic expansion valve (DT) prevents the fluid [G] from circulating in the liquid state, beyond the evaporator E. When the pressure in the evaporator is higher than the pressure in R1, the valve C4 opens and the gas G reacts with the solid <S> in the reactor R1, the heat of reaction being removed by means of an exchanger where F3 circulates.

Step 2: cycle (stage 1) (FIG. 14)

When the synthesis reaction has ended in the reactor R1, the valve EV2 opens. When the pressure in the evaporator E is higher than the pressure prevailing in the reactor R2, the valve C5 opens and the fluid [G], which evaporates in E, reacts with the solid <S> present in the reactor R2.

The heat of evaporation is contributed to the evaporator E by the fluid F2 and the heat of reaction released in R2 is removed by the fluid F3.

Simultaneously with the opening of the valve EV2, opening of the valve EV4 takes place: the solid <S,G> present in the reactor R1 is heated by the fluid F4. When the pressure in R1 is higher than that prevailing in the condenser C (or in the collector), the valve C1 opens, the valve C4 having closed as soon as the pressure in R1 was higher than that prevailing in the evaporator E. The gas (G) originating from R1 is condensed in the condenser C by the fluid F1 and flows into the collector Co.

Step 3: cycle (stage 2) (FIG. 15)

When the reactions in the reactors R1 and R2 have ended, the valve EV4 closes and the valve EV5 opens. The solid <S,G> present in R2 is heated by the fluid F4. The pressure in R2 rises and, successively, the valve C5 closes and the valve C2 opens. The gas (G) originating from R2 condenses in the condenser C, the heat of condensation being removed by the fluid F1, and flows into the collector Co. The fluid F3 circulates in the exchanger in the evaporator E of the reactor R1. As the latter cools, the pressure drops and, successively, the valve C1 closes and the valve C4 opens. The fluid (G) evaporated in the evaporator E reacts in the reactor R1 with the solid <S>. The heat of evaporation is, as previously, contributed by fluid F2, which cools and which is therefore employed for producing cold.

Alternation of stages 1 and 2 forms the normal operating cycle of the system.

Step 4: operation on storage (FIG. 16)

The fluid F4 is not heated and no longer circulates in the reactor R2. The circulation of (G), from R2 towards the condenser C, is stopped by the closing of the valve EV2.

The fluid F3 no longer circulates in the reactor R1, the circulation of (G) from the evaporator towards the reactor R1 is stopped by the closing of the valve EV1.

The solenoid valve EV3 is open and the fluid F3 circulates in an exchanger EC3 situated in the reactor R3. When the pressure in the evaporator E is higher than the pressure prevailing in R3, the valve C6 opens and the fluid (G) evaporated in E reacts with the solid <S> in R3; the heat of reaction is removed by F3 and the cold is conveyed by the fluid F2 cooled in the evaporator E.

Step 5: recommencement of the cycle (stage 2)

When the operation on storage is stopped, the normal cycle recommences at step 3 (cycle: stage 2). The valve EV3 is closed and the valves EV1 and EV2 are reopened. The fluid F4 is heated and circulates again in the reactor R2. The operation is then identical with that described in step 3.

Step 6: recharge

This step corresponds to the stoppage of the cycle and to the restoring of the whole system to the initial state.

The valves EV1, EV2 and EV3 are open. The valves EV4, EV5 and EV6 being open, the fluid F4 circulates in the three reactors R1, R2 and R3. The solids inside these are heated: when the pressure in R1, R2 and R3 is higher than the pressure prevailing in the condenser, the valves C1, C2 and C3 open and the gas (G), originating from the decompositions of <S,G> condenses in the condenser and flows towards the collector Co. The heat of condensation is removed by the fluid F1.

This operation is continued until the reactors contain only the solid <S>, that is to say until the step 0 (initial state) is regained.

As described with reference to the device with two reactors, the techniques employed for controlling temperatures (VPC) and for defrosting may be applied to this device with three reactors.

From the abovementioned description it follows that the third reactor R3 enables energy to be stored without an energy input other than that needed to circulate the heat-transfer fluid F4.

Naturally, the invention is not limited to the examples of embodiment which have just been described and many modifications can be made to the latter without departing from the scope of the invention.

Thus, the heat source S employed to heat the reactors R, R1, R2, R3 may be any other heat source of thermal or electric origin which is available, provided that it is at the required temperature $T_h$.

The fluid F4 may be any heat-transfer fluid other than oil.

Furthermore, the fluids F1, F2, F3 may be other than air.

Naturally, the process and the device in accordance with the invention may also be applied to the air conditioning of buildings, particularly of dwellings.

I claim:

1. A method for producing cold by means of a device comprising at least a reactor (R, R1, R2, R3) which contains a solid compound capable of reacting with a gas according to an exothermic reaction, this reactor being connected via one single isolation valve by separate circuits to a condenser (C) and an evaporator (E) which is in a heat exchange relationship with an enclosure to be cooled, the condenser (C) and the evaporator (E) being respectively connected by separate lines to a gas collector (Co), the interior of the reactor being in a heat exchange relationship with an external heat source (S), wherein the following simultaneous reactions are carried out in the reactor (R, R1, R2, R3):

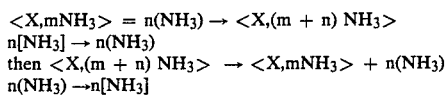

the symbols < >, and   denoting the sold, liquid and gaseous states respectively, X being chosen from $ZnCl_2$, $CuSO_4$, CuCl, LiBr, LiCl, $ZnSO_4$, $SrCl_2$, $MnCl_2$, $FeCl_2$, $MgCl_2$, $CaCl_2$ and $NiCl_2$, and wherein, for the purpose of producing cold down to −40° C. in the enclosure to be refrigerated, the maximum temperature outside the latter being not more than 30° C., an external heat source (S) is employed, whose temperature is higher than a value Th, m and n being integers and Th having a value such that: for:

X = $ZnCl_2$(m = 2, n = 2)   $T_h$ = 139° C.
X = $CuSO_4$(m = 4, n = 1)   $T_h$ = 145° C.
X = CuCl(m = 1, n = 0.5)   $T_h$ = 151° C.
X = LiBr(m = 2, n = 1)   $T_h$ = 155° C.
X = LiCl(m = 1, n = 1)   $T_h$ = 167° C.
X = $ZnSO_4$(m = 3, n = 1)   $T_h$ = 173° C.
X = $SrCl_2$(m = 0, n = 1)   $T_h$ = 173° C.
X = $MnCl_2$(m = 2, n = 4)   $T_h$ = 174° C.
X = LiCl(m = 0, n = 1)   $T_h$ = 203° C.
X = $FeCl_2$(m = 2, n = 4)   $T_h$ = 208° C.
X = $MgCl_2$(m = 4, n = 2)   $T_h$ = 217° C.
X = $CuSO_4$(m = 2, n = 2)   $T_h$ = 230° C.
X = $ZnSO_4$(m = 2, n = 1)   $T_h$ = 247° C.
X = $CaCl_2$(m = 1, n = 1)   $T_h$ = 265° C.
X = $NiCl_2$(m = 2, n = 4)   $T_h$ = 282° C.

2. A method for producing cold by means of a device comprising at least a reactor (R, R1, R2, R3) which contains a solid compound capable of reacting with a gas according to an exothermic reaction, this reactor being connected via one single isolation valve by separate circuits to a condenser (C) and an evaporator (E) which is in a heat exchange relationship with an enclosure to be cooled, the condenser (C) and the evaporator (E) being respectively connected by separate lines to a gas collector (Co), the interior of the reactor being in a heat exchange relationship with an external heat source (S), wherein the following simultaneous reactions are carried out in the reactor (R, R1, R2, R3):

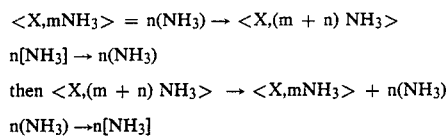

the symbols < >, and   denoting the sold, liquid and gaseous states respectively, X being chosen from $ZnCl_2$, $CuSO_4$, CuCl, LiBr, LiCl, $ZnSO_4$, $SrCl_2$, $MnCl_2$, $FeCl_2$, $MgCl_2$, $CaCl_2$ and $NiCl_2$, and wherein, for the purpose of producing cold down to +10° C. in the enclosure to be refrigerated, the maximum temperature outside the latter being not more than +80° C., an external heat source (S) is employed, whose temperature is higher than a value Th, m and n being integers and Th having a value such that: for $X = ZnCl_2(m = 2, n = 2)$    $T_h = 162°$ C.

$X = CuSO_4(m = 4, n = 1)$    $T_h = 170°$ C.

$X = CuCl(m = 1, n = 0.5)$    $T_h = 180°$ C.

$X = LiBr(m = 2, n = 1)$    $T_h = 196°$ C.

$X = ZnSO_4(m = 3, n = 1)$    $T_h = 200°$ C.

$X = LiCl(m = 1, n = 1)$    $T_h = 208°$ C.

$X = MnCl_2(m = 2, n = 4)$    $T_h = 212°$ C.

$X = SrCl_2(m = 0, n = 1)$    $T_h = 217°$ C.

$X = LiCl(m = 0, n = 1)$    $T_h = 249°$ C.

$X = FeCl_2(m = 2, n = 4)$    $T_h = 256°$ C.

$X = MgCl_2(m = 4, n = 2)$    $T_h = 256°$ C.

$X = CuSO_4(m = 2, n = 2)$    $T_h = 265°$ C.

$X = ZnSO_4(m = 2, n = 1)$    $T_h = 282°$ C.

$X = CaCl_2(m = 1, n = 1)$    $T_h = 311°$ C.

$X = NiCl_2(m = 2, n = 4)$    $T_h = 338°$ C.

3. The method as claimed in claim 1, the device comprising two reactors (R1, R2) containing the same solid compound, communication circuits between these reactors, the evaporator (E), the condenser (C) and the gas collector (Co), wherein the solid-gas reactions are successively started in the two reactors and the openings and closings of the various communication circuits are produced in a predetermined order to obtain a continuous production of cold.

4. The method as claimed in claim 3, which comprises the following successive steps:

(A) opening of the circuit between one (R1) of the reactors and the evaporator (E) and between the latter and the gas collector (Co), (B) opening of the circuit between the evaporator (E) and the reactor (R1) as soon as the gas pressure in the evaporator (E) is higher than that in the reactor (R1), (C) opening of the circuit between the other reactor (R2) and the evaporator (E) and between the latter and the gas collector (Co), (D) opening of the circuit between the evaporator (E) and the reactor (R2) as soon as the gas pressure in the evaporator (E) is higher than that in the reactor (R2), (E) opening of the circuit between the reactor (R1) and the external heat source (S) to heat the solid contained in this reactor, (F) opening of the circuit between the reactor (R1) and the condenser (C) as soon as the pressure in the reactor is higher than that in the condenser, (G) closing of the circuit between the reactor (R1) and the heat source (S) and the opening of the circuit between the reactor (R2) and the heat source (S), (H) closing, under the effect of pressure prevailing in the reactor (R2), of the circuit included between the latter and the evaporator (E) and opening of the circuit between the reactor (R2) and the condenser (C), (I) closing, after a pressure drop in the reactor (R1), of the circuit between the latter and the condenser (C) and opening of the circuit between this reactor (R1) and the evaporator (E).

5. The method as claimed in claim 4, which comprises the step of triggering defrosting, said step including the following operations:

closing of the circuit between the two reactors (R1) and (R2), opening of the circuit between the evaporator (E) and the condenser (C) and opening of the circuit between the evaporator (E) and the gas collector (Co).

6. The method as claimed in claim 5, which comprises, after defrosting, the following operations:

closing of the circuits between the evaporator (E) and the condenser (C) and between the evaporator (E) and the gas collector (Co).

7. The method as claimed in claim 3, further comprising the step of controlling the pressure and the temperature of gas evaporation.

8. The method as claimed in claim 3, further comprising the step of preventing the fluid condensed in the condenser (C) from circulating in the liquid state beyond the evaporator (E).

9. The method as claimed in claim 3, the device comprising a third reactor (R3) containing the said solid compound capable of reacting with the gas and connected to the external heat source (S), the condenser (C), the collector (Co) and the evaporator (E), wherein the solid-gas reactions are successively started in the three reactors (R1, R2, R3) so that the third reactor (R3) can store energy without an energy input other than that needed for the circulation of the heat-transfer fluid (F4).

10. The method as claimed in claim 9, comprising the following successive operating steps:

(A) opening of the circuit between the first reactor (R1) and the evaporator (E) and between the latter and the collector (Co), (B) opening of the circuit between this reactor (R1) and the condenser (C), between the second reactor (R2) and the evaporator (E) and between the collector (Co) and the condenser (C), (C) opening of the circuit between the first reactor (R1) and the evaporator (E), between the second reactor (R2) and the condenser (C) and between the latter and the collector (Co), (D) opening of the circuit between the third reactor (R3) and the evaporator (E) and between the latter and the collector (Co).

11. The method as claimed in claim 2, the device comprising two reactors (R1, R2) containing the same solid compound, communication circuits between these reactors, the evaporator (E), the condenser (C) and the gas collector (Co), wherein the solid-gas reactions are successively started in the two reactors and the openings and closings of the various communication circuits are produced in a predetermined order to obtain a continuous production of cold.

12. The method as claimed in claim 11, which comprises the following successive steps:

(A) opening of the circuit between one (R1) of the reactors and the evaporator (E) and between the latter and the gas collector (Co), (B) opening of the circuit between the evaporator (E) and the reactor (R1) as soon as the gas pressure in the evaporator (E) is higher than that in the reactor (R1), (C) opening of the circuit between the other reactor (R2) and the evaporator (E) and between the latter and the gas collector (Co), (D) opening of the circuit between the evaporator (E) and the reactor (R2) as soon as the gas pressure in the evaporator (E) is higher than that in the reactor (R2), (E) opening of the circuit between the reactor (R1) and the external heat source (S) to heat the solid contained in this reactor, (F) opening of the circuit between the reactor (R1) and the condenser (C) as soon as the pressure in the reactor is higher than that in the condenser, (G) closing of the circuit between the reactor (R1) and the heat source (S) and opening of the circuit between the reactor (R2) and the heat source (S), (H) closing, under the effect of pressure prevailing in the reactor (R2), of the circuit included between the latter and the evaporator (E) and opening of the circuit between the reactor (R2) and the condenser (C), (I) closing, after a pressure drop in the reactor (R1), of the circuit between the latter and the condenser (C) and opening of the circuit between this reactor (R1) and the evaporator (E).

13. The method as claimed in claim 12, which comprises the step of triggering defrosting, said step including the following operations:

closing of the circuit between the two reactors (R1) and (R2), opening of the circuit between the evaporator (E) and the condenser (C) and opening of the circuit between the evaporator (E) and the gas collector (Co).

14. The method as claimed in claim 13, which comprises, after defrosting, the following operations:

closing of the circuits between the evaporator (E) and the condenser (C) and between the evaporator (E) and the gas collector (Co).

15. The method as claimed in claim 11, further comprising the step of controlling the pressure and the temperature of gas evaporation.

16. The method as claimed in claim 11, further comprising the step of preventing the fluid condensed in the condenser (C) from circulating in the liquid state beyond the evaporator (E).

17. The method as claimed in claim 11, the device comprising a third reactor (R3) containing the said solid compound capable of reacting with the gas and connected to the external heat source (S), the condenser (C), the collector (Co) and the evaporator (E), wherein the solid-gas reactions are successively started in the three reactors (R1, R2, R3) so that the third reactor (R3) can store energy without an energy input other than that needed for the circulation of the heat-transfer fluid (F4).

18. The method as claimed in claim 17, comprising the following successive operating steps:

(A) opening of the circuit between the first reactor (R1) and the evaporator (E) and between the latter and the collector (Co), (B) opening of the circuit between this reactor (R1) and the condenser (C), between the second reactor (R2) and the evaporator (E) and between the collector (Co) and the condenser (C), (C) opening of the circuit between the first reactor (R1) and the evaporator (E), between the second reactor (R2) and the condenser (C) and between the latter and the collector (Co), (D) opening of the circuit between the third reactor (R3) and the evaporator (E) and between the latter and the collector (Co).

* * * * *